United States Patent

Shimotsu

[11] Patent Number: 6,057,042
[45] Date of Patent: May 2, 2000

[54] ORGANOPOLYSILOXANE COMPOSITION FOR SURFACE TREATMENT AND SURFACE-TREATED EPDM ARTICLES

[75] Inventor: Hiroyoshi Shimotsu, Tokyo, Japan

[73] Assignee: Toshiba Silicone Co., Ltd., Tokyo, Japan

[21] Appl. No.: 09/116,203

[22] Filed: Jul. 16, 1998

[30] Foreign Application Priority Data

Jul. 30, 1997 [JP] Japan ................................. 9-204535

[51] Int. Cl.$^7$ ........................................ B32B 13/12
[52] U.S. Cl. ........................... 428/451; 428/447; 428/50; 528/15; 528/18; 528/19; 528/21; 528/33; 528/34; 528/38
[58] Field of Search ...................... 528/18, 19, 15, 528/21, 34, 33, 38; 428/447, 500, 451

[56] References Cited

U.S. PATENT DOCUMENTS 5,536,537 7/1996 Mizushima et al. .................... 427/387
5,567,752 10/1996 Stein et al. .

FOREIGN PATENT DOCUMENTS

| | | |
|---|---|---|
| 0 482 480 A1 | 4/1992 | European Pat. Off. . |
| 50-10851 | 6/1973 | Japan . |
| 54-43891 | 4/1979 | Japan ........................ C09K 3/10 |
| 56-78960 | 6/1981 | Japan ........................ C08J 3/00 |
| 5-5082 | 1/1993 | Japan . |
| 6-25604 | 2/1994 | Japan . |
| 7-216229 | 8/1995 | Japan . |

*Primary Examiner*—Melvyn I. Marquis
*Attorney, Agent, or Firm*—Sughrue, Mion, Zinn, Macpeak & Seas, PLLC

[57] ABSTRACT

An organopolysiloxane composition for surface treatment comprising (A) a reaction product of (1) a silane and/or a siloxane each having a substituted or unsubstituted amino group bonded to the silicon atom via at least one carbon atom and also having an alkoxy group bonded to the silicon atom and (2) a silane and/or a siloxane each having a monovalent hydrocarbon group bonded to the silicon atom, the hydrocarbon group being substituted with an epoxy-containing group, and an alkoxy group bonded to the silicon atom, and (B) a specific organopolysiloxane containing an amino group. The composition provides a non-sticky, water-repellent and slippery film on a substrate, especially an EPDM rubber sheet and EPDM molded sponge, with markedly improved adhesion.

8 Claims, 1 Drawing Sheet

FIGURE
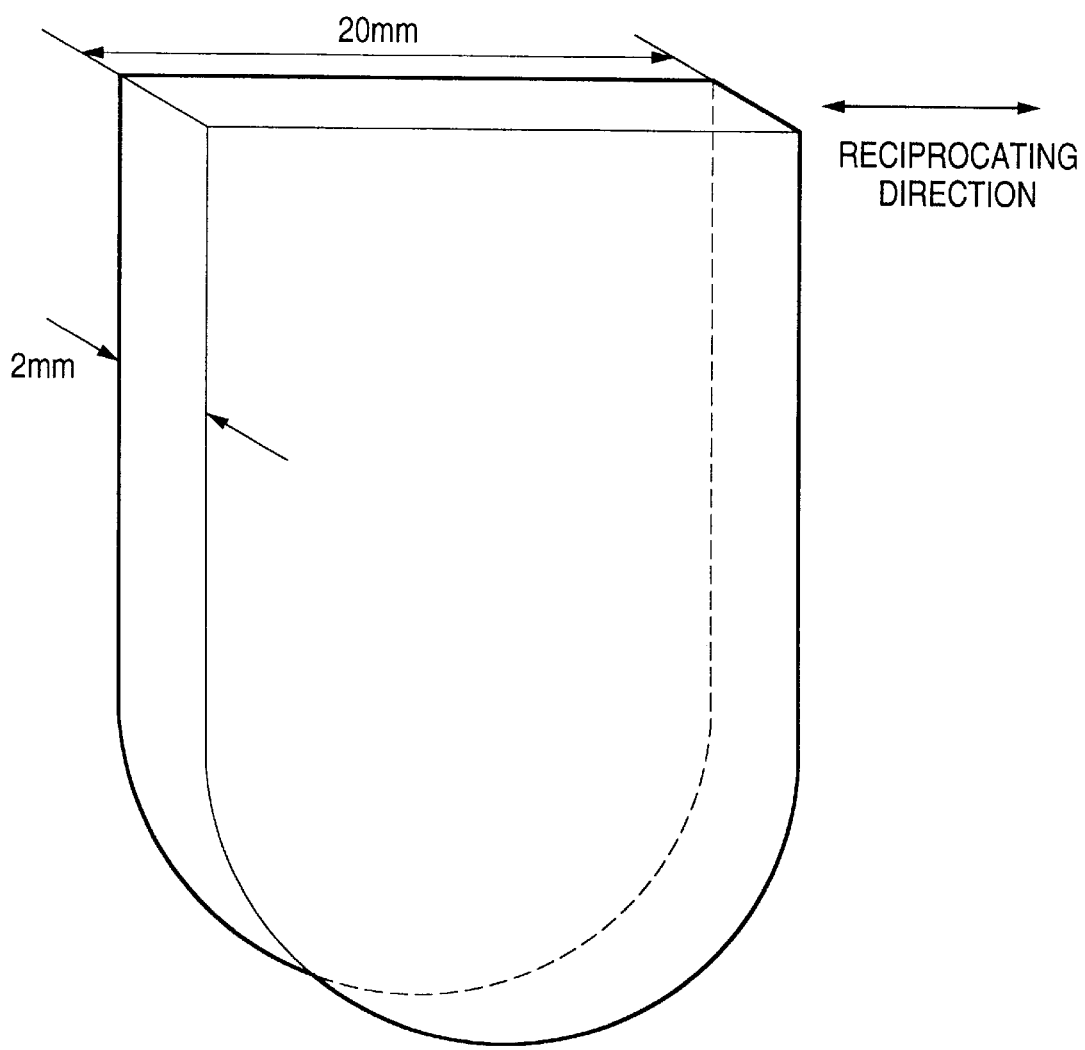

ORGANOPOLYSILOXANE COMPOSITION FOR SURFACE TREATMENT AND SURFACE-TREATED EPDM ARTICLES

FIELD OF THE INVENTION

This invention relates to a surface treating agent and more particularly to an organopolysiloxane composition for treating the surface of a substrate, such as paper, rubber, plastics and metal, to form a non-sticky, water-repellent, abrasion-resistant and slippery film, particularly a film having excellent adhesion to a rubber sheet or molded sponge of an ethylene-propylene-diene terpolymer (hereinafter abbreviated as "EPDM").

BACKGROUND OF THE INVENTION

Various organopolysiloxane compositions have been used for imparting non-stickiness to the surface of a substrate. Conventional organopolysiloxane compositions for this use are roughly divided into (1) a solution comprising a hydroxyl-terminated diorganopolysiloxane, an organopolysiloxane having an Si—H bond and/or an organoalkoxysilane, an organotin compound, and an organic solvent, (2) an aqueous emulsion comprising a hydroxyl-terminated diorganopolysiloxane, an organopolysiloxane having an Si—H bond and/or an organoalkoxysilane, polyvinyl alcohol, etc., emulsified in water, (3) a composition comprising an organopolysiloxane having at least two vinyl groups per molecule, an organopolysiloxane having an Si—H bond, platinum or a platinum compound, and an organic solvent and/or a curing inhibitor.

Although these organopolysiloxane compositions are excellent in providing a non-sticking film on a substrate, the cured silicone layer formed on a rubber or plastic substrate comes off the substrate easily. Further, the composition (3), when applied to a substrate made of natural rubber, general synthetic rubber or soft polyvinyl chloride, is often hindered from curing because a vulcanizer, a vulcanization accelerator or a plasticizer contained in the substrate ruins the activity of the platinum component.

In order to overcome these problems, and particularly to make a rubber or plastic surface non-sticky, water repellent and abrasion resistant, JP-A-54-43891 (the term "JP-A" as used herein means an "unexamined published Japanese patent application") teaches a composition comprising (i) an organopolysiloxane having at least two monovalent hydrocarbon groups substituted with an epoxy-containing group, such as a glycidoxy group and/or an epoxycyclohexyl group, bonded to the silicon atom in the molecule and (ii) an alkoxysilane and/or an alkoxysiloxane each having an alkoxy group bonded to the silicon atom and a substituted or unsubstituted amino group bonded to the silicon atom via at least one carbon atom. According to the disclosure, the composition cures into a slippery film, and addition to the composition of (iii) a diorganopolysiloxane blocked with a hydroxyl group at both terminals thereof, (iv) an organohydrogen polysiloxane and (v) a fatty acid metal salt brings about improved surface slip characteristics, adds flexibility to the cured film, and increases the rate of heat curing.

JP-A-56-78960 proposes a composition comprising (i) a mixture and/or a partial reaction product of an amino-containing silane and/or siloxane and an epoxy-containing silane and/or siloxane and (ii) a diorganopolysiloxane with its both terminals blocked with a hydroxyl group, to which are added (iii) an organohydrogen polysiloxane and (iv) a fatty acid metal salt to improve the rate of curing in room temperature curing and to inhibit whitening of the cured film with time.

When applied to a rubber substrate, these compositions provide a coating film excellent in non-stickiness, water repellency and abrasion resistance but do not always exhibit satisfactory adhesion to natural or organic rubber substrates. In particular, it has been demanded to improve the adhesion to EPDM articles such as a sheet and molded sponge.

SUMMARY OF THE INVENTION

An object of the present invention is to provide an organopolysiloxane composition for surface treatment, especially of an EPDM rubber sheet or EPDM molded sponge, to provide a coating film excellent in non-stickiness, water repellency, slipperiness and particularly adhesion to the substrate.

As a result of extensive investigations, the inventors of the present invention have found that an amino-containing organopolysiloxane and a reaction product of an amino-containing silane and/or siloxane and an epoxy-containing silane and/or siloxane are compounded into a surface treating agent exhibiting excellent adhesion to a substrate. The present invention has been reached based on this finding.

The present invention provides an organopolysiloxane composition for surface treatment which comprises:

(A) a reaction product of
   (1) a silane and/or a siloxane-each having a substituted or unsubstituted amino group bonded to the silicon atom via at least one carbon atom and also having an alkoxy group bonded to the silicon atom, and
   (2) a silane and/or a siloxane each having a monovalent hydrocarbon group bonded to the silicon atom, the hydrocarbon group being substituted with an epoxy-containing group, and an alkoxy group bonded to the silicon atom, and (B) an organopolysiloxane represented by the following average compositional formula (I):

$$[R^1_a Si(OR^2)_b O_{(4-a-b)/2}]_n \qquad (I)$$

wherein $R^1$ represents at least two substituents selected from a hydrogen atom and a monovalent substituted or unsubstituted hydrocarbon group, provided that at least two out of all the $R^1$'s in the molecule are monovalent hydrocarbon groups substituted with a substituted or unsubstituted amino group, the amino group being bonded to the silicon atom via at least one carbon atom; $R^2$ represents a hydrogen atom or a monovalent substituted or unsubstituted hydrocarbon group; a and b each represent a number satisfying the relationships $1 \leq a \leq 2.5$, $1 \leq a+b \leq 2.5$, and $0 \leq b \leq 0.5$; and n is a number of from 4 to 5,000.

The present invention also provides an EPDM article having been surface-treated with the organopolysiloxane composition.

BRIEF DESCRIPTION OF THE DRAWING

The FIGURE is a perspective view of a glass-made slider used in an abrasion test in Examples.

DETAILED DESCRIPTION OF THE INVENTION

The silane or siloxane as component (A)(1) is an alkoxysilane having a substituted or unsubstituted amino group bonded to the silicon atom via at least one carbon atom or a siloxane obtained through partial condensation of the alkoxysilane.

The substituted or unsubstituted amino group that is bonded to the silicon atom via at least one of its carbon atoms includes an aminomethyl group, a β-aminoethyl group, a γ-aminopropyl group, a δ-aminobutyl group, a γ-(methylamino)-propyl group, a γ-(ethylamino)propyl group, an N-(β-aminoethyl)-γ-aminopropyl group, and an N-(β-dimethylamino-ethyl)-γ-aminopropyl group. From the viewpoint of storage stability, it is preferred that there are at least three carbon atoms between an amino group and the silicon atom as with a γ-aminopropyl group.

In addition to the substituted or unsubstituted amino group, the silane and/or siloxane as component (A)(1) has an alkoxy group bonded to the silicon atom thereof for further ensuring the adhesion to a substrate. The alkoxy group includes methoxy, ethoxy, propoxy and butoxy groups. Methoxy and ethoxy groups are generally used for ease of synthesis. It is preferred for the silane or siloxane (A)(1) to have two or more alkoxy groups per molecule for securing satisfactory adhesion. Other organic groups that can be bonded to the silicon atom include alkyl groups having 1 to 6 carbon atoms.

The silane or siloxane as component (A)(2) is an alkoxysilane having an alkoxy group bonded to the silicon atom and a monovalent hydrocarbon group substituted with an epoxy-containing group bonded to the silicon atom or a siloxane obtained by partial condensation of the alkoxysilane. The epoxy-containing group includes a glycidoxy group and an epoxycyclohexyl group or a combination thereof, and the alkoxy group includes a methoxy group, an ethoxy group, a propoxy group, and a butoxy group. Methoxy and ethoxy groups are generally used for ease of synthesis. It is preferred for the silane or siloxane (A)(2) to have two or more alkoxy groups per molecule for securing satisfactory adhesion. Other organic groups that can be bonded to the silicon atom include alkyl groups having 1 to 6 carbon atoms.

Component (A) is a reaction product obtained by reacting the amino group of component (A)(1) and the epoxy group of component (A)(2). It is preferable that the silane and/or siloxane (A)(1) be used in such an amount as to furnish 0.5 to 2 amino groups per epoxy group of the silane and/or siloxane (A)(2). If component (A)(1) is used in greater amounts, the excess will remain unreacted.

While the reaction product of components (A)(1) and (A)(2) can be obtained even at ambient temperature, heating at 50 to 150° C. for 1 to 7 hours shortens the reaction time.

The organopolysiloxane as component (B) is a compound having a substituted or unsubstituted amino group bonded to the silicon atom via at least one carbon atom. Examples of the substituted or unsubstituted amino group bonded to the silicon atom via at least one carbon atom, i.e., amino-containing hydrocarbon group, are the same as enumerated above with respect to component (A)(1). In formula (I), $R^1$ other than the amino-containing hydrocarbon group includes a hydrogen atom, an alkyl group, e.g., methyl, ethyl, propyl, butyl and hexyl; an alkenyl group, e.g., vinyl and propenyl; an aryl group, e.g., phenyl; an aralkyl group, e.g., phenethyl; and these hydrocarbon groups with part of their hydrogen atoms displaced with a halogen atom, a nitrile group, etc. Preferred of them are a hydrogen atom, a methyl group, a vinyl group and a phenyl group for ease of synthesis and handling. A methyl group is particularly preferred.

$R^2$ in formula (I) includes a hydrogen atom, a methyl group, an ethyl group, propyl group, and a butyl group. Among them, a hydrogen atom, a methyl group and an ethyl group are usually used for ease of synthesis and handling.

In formula (I) a and b each represent a number satisfying the relationships $1 \leq a \leq 2.5$, $1 \leq a+b \leq 2.5$, and $0 \leq b \leq 0.5$. If a and (a+b) are less than 1, the resulting film is hard and lacks flexibility so that it fails to follow the deformation of a substrate or interferes with the deformation of a substrate. If they exceed 2.5, the composition is unsuitable as a film-forming surface treating agent because of poor curability. b, which indicates the number of a hydroxyl group or an alkoxy group bonded to the silicon atom, is 0.5 or smaller. If b exceeds 0.5, the composition has reduced storage stability and reduced curability, and the resulting cured film is brittle.

The degree of polymerization of organopolysiloxane (B), expressed by n in formula (I), is from 4 to 5,000, preferably from 4 to 1,000, taking into consideration ease of synthesis, a workable viscosity before curing, and mechanical properties after curing. If the degree of polymerization is lower than 4, sufficient film strength cannot be obtained. If it is higher than 5,000, synthesis is not easy, and the viscosity is too high for handling.

The amount of the amino group in the organopolysiloxane (B) is 50 to 15,000, preferably 70 to 1,000, and more preferably 80 to 500, in terms of amino equivalent. An organopolysiloxane having an amino equivalent exceeding 15,000 produces no effect in improving adhesion. One having an amino equivalent less than 50 is difficult to synthesize.

The proportion of component (B) in the composition is not particularly limited. It usually ranges from 10 to 200 parts by weight, and preferably 20 to 50 parts by weight, per 100 parts by weight of component (A). At too high or too low amounts no improvement is observed in adhesion to a substrate.

The object of the present invention, i.e., to impart non-stickiness, water repellency, abrasion resistance and slipperiness to a substrate surface and to improve the film strength, can be achieved by the composition essentially comprising components (A) and (B). In addition to these effects, an increase in curing rate of a coating film of the composition can be accomplished by further adding the following components (C) to (E).

Component (C) is a diorganopolysiloxane with its both terminals blocked with a hydroxyl group (hereinafter referred to as a "hydroxyl-blocked diorganopolysiloxane"). Component (C) takes part in a curing reaction with the reactivity of the hydroxyl groups at both terminals.

Organic groups bonded to the silicon atom in component (C) include an alkyl group, e.g., methyl, ethyl, propyl, butyl and hexyl; an alkenyl group, e.g., vinyl and propenyl; an aryl group, e.g., phenyl; an aralkyl group, e.g., phenethyl; and these hydrocarbon groups with part of their hydrogen atoms displaced with a halogen atom, a nitrile group, etc., with a methyl group being preferred for ease of synthesis and the balance between the viscosity before curing and the physical properties of a cured film.

The hydroxyl-blocked diorganopolysiloxane has a viscosity of 50 to 10,000,000 cSt, and preferably 1,000 to 2,000,000 cSt, at 25° C. If the viscosity is less than 50 cSt, a cured film becomes brittle. If it exceeds 10,000,000 cSt, the uncured composition becomes too viscous for handling.

The compounding proportion of component (C) and component (A) in the composition is not particularly limited and can be selected arbitrarily. The composition has excellent non-stickiness and water repellency as the amount of component (C) increases, and the composition has excellent abrasion resistance as the amount of component (A) increases. Component (A) is used in an amount of preferably 1 to 300 parts by weight, and more preferably 10 to 100 parts by weight, per 100 parts by weight of component (C).

Component (D) is an organohydrogen polysiloxane having at least three hydrogen atoms bonded to the silicon atom, which undergoes dehydrogenating condensation with the hydroxyl-blocked diorganopolysiloxane (C) to form a network structure. Organic groups which can be bonded to the silicon atom in the molecule include those enumerated above with reference to component (C). The siloxane chain in the organohydrogen polysiloxane may be straight, branched or cyclic.

Component (D) is preferably used in an amount of 0.5 to 50 parts by weight per 100 parts by weight of component (C). At amounts less than 0.5 part, the curing rate tends to be too slow to form a continuous film. If used in amounts exceeding 50 parts, component (D) impairs the stability of the composition, causing foaming.

Component (E) is a curing catalyst, which catalyzes the dehydrating condensation between the hydroxyl group of component (C) and the Si—H bond of component (D). The curing catalyst includes fatty acid metal salts, amines, quaternary ammonium hydroxides, and a combination thereof.

Examples of suitable fatty acid metal salts include those having an organic group bonded directly to a metal atom, such as dibutyltin diacetate, dibutyltin dioctoate, dibutyltin dilaurate, dibutyltin dioleate, dibutyltin distearate, tributyltin acetate, tributyltin octoate, tributyltin laurate, dioctyltin diacetate, dioctyltin dilaurate, diethyltin dioleate, and monomethyltin dioleate; and those in which an organic group is not directly bonded to a metal atom, such as zinc octenoate, iron octenoate, and tin octenoate.

Examples of suitable amines include organic amines, such as monomethylamine, dimethylamine, monoethylamine, diethylamine, ethylenediamine, and hexamethyltetramine; and amino-containing silane compounds, such as α-aminopropyltriethoxysilane, and salts thereof. Examples of the quaternary ammonium hydroxides are tetramethylammonium, dimethylbenzylammonium, and their salts.

Component (E) is preferably used in an amount of 0.5 to 10 parts by weight per 100 parts by weight of the total of components (C) and (D). If the amount of component (E) is less than 0.5 part, the composition is slow in curing and, after application to a substrate followed by heat treatment, blocking tends to occur. If component (E) exceeds 10 parts, cure reaction proceeds before application to shorten the pot life.

The composition comprising the aforesaid essential components (A) and (B) and optional components (C) to (E) can be used for surface treatment of various substrates either as such or as diluted with an organic solvent or as emulsified in water with an appropriate emulsifier.

Usable organic solvents include n-hexane, n-heptane, petroleum hydrocarbons, toluene, xylene, isopropyl alcohol, butyl alcohol, ethyl acetate, and methyl ethyl ketone. The amount of the solvent to be added is decided appropriately depending on the desired viscosity of the composition for application.

The surface treatment with the composition according to the present invention can be carried out as follows.

Components (A)(1) and (A)(2) are mixed to prepare component (A). While not essential, the reaction can be accelerated by heating with stirring, which results in formation of partial condensation products. To the mixture is added component (B) or are added components (B) to (E) to prepare a treating agent. As previously stated, the resulting treating agent may be diluted with a solvent or emulsified with water and an emulsifier.

The treating agent thus prepared is applied to a substrate made of paper, rubber, plastics or metal by dip coating, spray coating, brush coating, knife coating, roll coating or the like coating technique. A solvent or water, if present in the composition, is removed by drying. The coating film is cured by allowing to stand at room temperature for several hours or heating under conditions selected according to the thermal resistance of the substrate. For example, heating is preferably conducted at 120 to 180° C. for 10 to 30 seconds for paper substrates; at 150 to 180° C. for 1 to 5 minutes for rubber substrates; and at 70 to 150° C. for 30 seconds to 2 minutes for plastic substrates.

If desired, known silane coupling agents can be added to the composition of the present invention in order to further improve the adhesion to a substrate. The silane coupling agents may be used either individually or as a mixture thereof or as partially condensed.

If desired, the composition of the present invention can further contain organic or inorganic ultraviolet absorbers for improving weather resistance; high-viscosity dimethyl polysiloxane for further improving slip characteristics; inorganic fillers or organic fillers (e.g., polyalkylsilsesquioxane and polycarbonate resins) having an average particle size of about 0.01 to 100 μm for producing a matte effect and improving slipperiness; and inorganic pigments for coloring, as far as is consistent with the spirit of the present invention.

Compared with conventional silicone compositions, the organopolysiloxane composition of the present invention provides a cured film on various substrates with good adhesion. In particular, it exhibits excellent adhesion to rubber and plastic substrates, to which the conventional silicone compositions for providing a non-sticky film has insufficient adhesion, especially EPDM rubber sheets or molded sponge. Since the composition of the present invention cures at ambient temperature to relatively low temperatures to form a cured film exhibiting satisfactory non-stickiness to other substances, water repellency, and excellent abrasion resistance, it is useful for surface treatment of substrates having low heat resistance or large substrates that are hard to give a heat treatment. Therefore, the composition of the present invention is suitable as a surface treating agent for EPDM rubber articles, such as weather strips, vibration dampers, gaskets for construction materials, and the like.

Further, the composition is useful for imparting non-stickiness and water repellency to various substrates, such as rubber and plastics. The composition is also applicable as a primer for a substrate to which a silicone rubber or a silicone composition curable into rubber is to be adhered.

The present invention will now be described in greater detail with reference to Examples, but it should be understood that the invention is not deemed to be limited thereto. Unless otherwise indicated, all the parts are by weight.

EXAMPLE 1

Ten parts of a reaction product obtained by reacting 1 mol of γ-[N-(β-aminoethyl)amino]propyltrimethoxysilane and 1 mol of γ-glycidoxypropyltrimethoxysilane at 80 to 100° C. for 3 hours while stirring, 10 parts of an amino-containing dimethyl polysiloxane represented by formula:

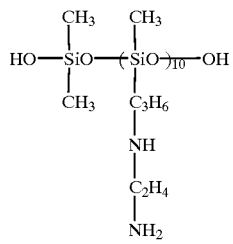

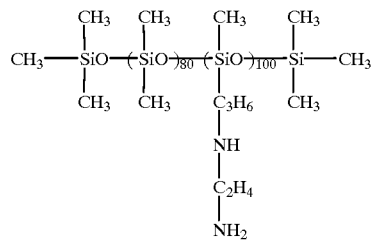

and 80 parts of toluene were mixed and dispersed in a homogenizer. An EPDM rubber sheet or EPDM sponge was coated with the resulting composition by spraying and allowed to stand at room temperature for 24 hours to evaporate toluene and to cure the coating film.

EXAMPLE 2

γ-Aminopropyltrimethoxysilane (1 mol) was put in a flask and heated under reflux while dropping an equimolar amount of water to conduct hydrolysis. To the resulting alkoxysiloxane was added 1 mol of γ-glycidoxypropyltrimethoxysilane, and the mixture was allowed to react at 80 to 100° C. for 3 hours while stirring. Ten parts of the resulting reaction product, 5 parts of an amino-containing organopolysiloxane represented by formula:

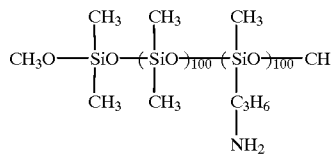

and 85 parts of toluene were mixed and dispersed in a homogenizer. Surface-treated EPDM rubber sheet and sponge were obtained by using the resulting composition in the same manner as in Example 1.

EXAMPLE 3

β-(3,4-Epoxycyclohexyl)ethyltrimethoxysilane (1 mol) was put in a flask and refluxed while dropping an equimolar amount of water to conduct hydrolysis. To the resulting alkoxysiloxane was added 1 mol of γ-aminopropyltrimethoxysilane, and the mixture was allowed to react at 80 to 100° C. for 3 hours while stirring. Ten parts of the resulting reaction product, 15 parts of an amino-containing organopolysiloxane represented by formula:

and 75 parts of toluene were mixed and dispersed in a homogenizer to prepare a composition. Surface-treated EPDM rubber sheet and sponge were obtained by using the resulting composition in the same manner as in Example 1.

COMPARATIVE EXAMPLE 1

Surface-treated EPDM rubber sheet and sponge were obtained in the same manner as in Example 1, except that the composition was prepared without using the amino-containing dimethyl polysiloxane.

COMPARATIVE EXAMPLE 2

Surface-treated EPDM rubber sheet and sponge were obtained in the same manner as in Example 1, except that the composition was prepared by using γ-[[N-(β-aminoethyl)amino]-propyltrimethoxysilane in place of the amino-containing dimethyl polysiloxane.

COMPARATIVE EXAMPLE 3

Surface-treated EPDM rubber sheet and sponge were obtained in the same manner as in Example 1, except that the composition was prepared by dispersing in a homomixer 5 parts of γ-[N-(β-aminoethyl)amino]propyltrimethoxysilane, 5 parts of γ-glycidoxypropyltrimethoxysilane, 10 parts of the amino-containing dimethyl polysiloxane used in Example 1, and 80 parts of toluene.

The coating films of the surface-treated EPDM rubber sheets or sponge obtained in Examples 1 to 3 and Comparative Examples 1 to 3 were rubbed with a finger to evaluate the film strength. Further, a peel test was carried out in accordance with the following test method to evaluate the adhesion of the film to the substrate. The results of these evaluations are shown in Table 1 below.

The coating film was cross-cut to make 100 1 mm-squares. An adhesive tape (prepared by applying a silicone adhesive YR3340, produced by Toshiba Silicone Co., Ltd., to a polyester film to a thickness of 40 μm and allowing the coated film in a thermo-hygrostat for 48 hours) was stuck onto the cross-cut film and peeled off. The number of the squares remaining on the substrate was counted as an indication of adhesive strength.

TABLE 1

|  |  | Example 1 | Example 2 | Example 3 | Comparative Example 1 | Comparative Example 2 | Comparative Example 3 |
|---|---|---|---|---|---|---|---|
| Film Strength (rubbing test) | Sheet | no change | no change | no change | film came off substrate | film came off substrate | film came off substrate |
|  | Sponge | no change | no change | no change | no change | no change | film came off substrate |
| Adhesion (peel test) | Sheet | 100/100 | 100/100 | 100/100 | 20/100 | 20/100 | 0/100 |
|  | Sponge | 100/100 | 100/100 | 100/100 | 100/100 | 100/100 | 20/100 |

EXAMPLE 4

The composition of Example 1 was applied to an EPDM sheet or EPDM sponge with a brush and allowed to stand at room temperature for 2 minutes to remove the solvent to form a primer coat.

A coating composition prepared by dispersively mixing 40 parts of a dimethyl polysiloxane represented by formula:

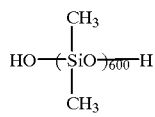

1 part of methylhydrogen siloxane represented by formula:

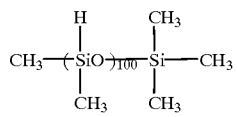

1 parts of dibutyltin dilaurate, and 250 parts of toluene was applied to the surface-treated rubber sheet or sponge by spraying. After evaporating the solvent, the coating was heated at 100° C. for 10 minutes to form a cured silicone rubber coat.

EXAMPLE 5

EPDM rubber sheet and sponge having a cured silicon rubber coat were obtained in the same manner as in Example 4, except for using the composition of Example 2 in place of the composition of Example 1.

EXAMPLE 6

EPDM rubber sheet and sponge having a cured silicon rubber coat were obtained in the same manner as in Example 4, except for using the composition of Example 3 in place of the composition of Example 1.

COMPARATIVE EXAMPLE 4

EPDM rubber sheet and sponge having a cured silicon rubber coat were obtained in the same manner as in Example 4, except for using the composition of Comparative Example 1 in place of the composition of Example 1.

COMPARATIVE EXAMPLE 5

EPDM rubber sheet and sponge having a cured silicon rubber coat were obtained in the same manner as in Example 4, except for using the composition of Comparative Example 2 in place of the composition of Example 1.

COMPARATIVE EXAMPLE 6

EPDM rubber sheet and sponge having a cured silicon rubber coat were obtained in the same manner as in Example 4, except for using the composition of Comparative Example 3 in place of the composition of Example 1.

COMPARATIVE EXAMPLE 7

EPDM rubber sheet and sponge having a cured silicon rubber coat were obtained in the same manner as in Example 4, except that the substrate was spray-coated with the coating composition comprising dimethyl polysiloxane, methylhydrogen siloxane, dibutyltin dilaurate, and toluene without forming a primer coat.

The EPDM rubber sheet and sponge having a silicone rubber coat obtained in Examples 4 to 6 and Comparative Examples 4 to 7 were subjected to a peel test in the same manner as in Example 1. Further, an abrasion test was carried out as follows. A 10 mm thick and 20 mm wide stainless steel slider having a curved sliding surface was pressed onto the EPDM rubber sheet or sponge under a load of 500 g and slid back and forth over a 10 cm stroke at a speed of 30 double strokes per minute. The number of double strokes at which the rubber surface wore off was taken as an indication of abrasion resistance. The results of these evaluations are shown in Table 2 below.

TABLE 2

|  |  | Example 4 | Example 5 | Example 6 | Compara. Example 4 | Compara. Example 5 | Compara. Example 6 | Compara. Example 7 |
|---|---|---|---|---|---|---|---|---|
| Adhesion (peel test) | Sheet | 100/100 | 100/100 | 100/100 | 30/100 | 20/100 | 10/100 | 0/100 |
|  | Sponge | 100/100 | 100/100 | 100/100 | 100/100 | 100/100 | 80/100 | 0/100 |
| Abrasion Resistance (number of double strokes) | Sheet | 1500 | 1000 | 1200 | 150 | 80 | 110 | 50 |
|  | Sponge | 15000 | 9000 | 13000 | 13000 | 8000 | 10000 | 50 |

EXAMPLE 7

The following components were dispersively mixed in a homomixer to prepare a composition.

| Composition of Example 1 | 100 parts |
|---|---|
| Dimethyl polysiloxane used in Example 4 | 200 parts |
| Methylhydrogen siloxane used in Example 4 | 10 parts |
| Dibutyltin dilaurate | 10 parts |
| Toluene | 680 parts |

The resulting composition was applied to an EPDM rubber sheet and EPDM sponge by spraying. After evaporating the solvent, the coating film was cured by heating at 100° C. for 10 minutes to form a cured rubbery film.

EXAMPLE 8

The following components were dispersively mixed in a homomixer to prepare a composition.

| Composition of Example 1 | 100 parts |
|---|---|
| Dimethyl polysiloxane used in Example 4 | 200 parts |
| Methylhydrogen siloxane used in Example 4 | 10 parts |
| Carbon (acetylene black) | 10 parts |
| True spherical polysilsesquioxane | 60 parts |

| | |
|---|---|
| particles (average particle size: 4 μm) | |
| Dibutyltin dilaurate | 10 parts |
| Toluene | 1110 parts |

The resulting composition was applied to an EPDM rubber sheet and EPDM sponge by spraying. After evaporating the solvent, the coating film was cured by heating at 100° C. for 10 minutes to form a cured silicone rubber film.

EXAMPLE 9

The following components were dispersively mixed in a homomixer to prepare a composition.

| | |
|---|---|
| Composition of Example 1 | 100 parts |
| Dimethyl polysiloxane used in Example 4 | 200 parts |
| Methylhydrogen siloxane used in Example 4 | 10 parts |
| γ-Aminopropyltrimethoxysilane | 25 parts |
| 7% Dispersion of amorphous polycarbonate having an average particle size of 4 μm in a xylene-cyclohexanone mixed solvent (75:25) (prepared by melt precipitation) | 150 parts |
| Dibutyltin dilaurate | 10 parts |
| Toluene | 1005 parts |

The resulting composition was applied to an EPDM rubber sheet and EPDM sponge by spraying. After evaporating the solvent, the coating film was cured by heating at 100° C. for 10 minutes to form a cured rubbery film.

COMPARATIVE EXAMPLE 8

Silicone rubber film-coated EPDM rubber sheet and sponge were prepared in the same manner as in Example 7, except for using the composition of Comparative Example 1 in place of the composition of Example 1.

COMPARATIVE EXAMPLE 9

Silicone rubber film-coated EPDM rubber sheet and sponge were prepared in the same manner as in Example 7, except for using the composition of Comparative Example 2 in place of the composition of Example 1.

COMPARATIVE EXAMPLE 10

Silicone rubber film-coated EPDM rubber sheet and sponge were prepared in the same manner as in Example 7, except for using the composition of Comparative Example 3 in place of the composition of Example 1.

COMPARATIVE EXAMPLE 11

Silicone rubber film-coated EPDM rubber sheet and sponge were prepared in the same manner as in Example 7, except that the composition of Example 1 was not used.

The surface-treated EPDM rubber sheet and sponge obtained in Examples 7 to 9 and Comparative Examples 8 to 11 were subjected to a peel test in the same manner as in Example 1. Further, an abrasion test was carried out as follows. A 2 mm thick and 20 mm wide glass slider having a curved sliding surface (see FIG. 1) was pressed onto the EPDM rubber sheet or sponge under a load of 300 g and slid back and forth over a 10 cm stroke at a speed of 30 double strokes per minute. The number of double strokes at which the rubber surface wore off was taken as an indication of abrasion resistance. The results of these evaluations are shown in Table 3 below.

TABLE 3

| | | Example 7 | Example 8 | Example 9 | Compara. Example 8 | Compara. Example 9 | Compara. Example 10 | Compara. Example 11 |
|---|---|---|---|---|---|---|---|---|
| Adhesion (peel test) | Sheet | 100/100 | 100/100 | 100/100 | 18/100 | 25/100 | 10/100 | 0/100 |
| | Sponge | 100/100 | 100/100 | 100/100 | 100/100 | 100/100 | 80/100 | 0/100 |
| Abrasion Resistance (number of double strokes) | Sheet | 3000 | 4500 | 5000 | 500 | 800 | 300 | 100 |
| | Sponge | 20000 or more | 20000 or more | 20000 or more | 7000 | 4500 | 3000 | 500 |

While the invention has been described in detail and with reference to specific examples thereof, it will be apparent to one skilled in the art that various changes and modifications can be made therein without departing from the spirit and scope thereof.

What is claimed is:

1. An organopolysiloxane composition for surface treatment which comprises:
   (A) a reaction product of
      (1) a silane and/or a siloxane each having a substituted or unsubstituted amino group bonded to a silicon atom via at least one carbon atom and also having an alkoxy group bonded to the silicon atom, and
      (2) a silane and/or a siloxane each having a monovalent hydrocarbon group bonded to a silicon atom, the hydrocarbon group being substituted with an epoxy-containing group, and an alkoxy group bonded to the silicon atom, and
   (B) an organopolysiloxane represented by the following average compositional formula (I):

$$[R^1{}_a Si(OR^2)_b O_{(4-a-b)/2}]_n \qquad (I)$$

wherein $R^1$ represents at least two substituents selected from a hydrogen atom and a monovalent substituted or unsubstituted hydrocarbon group, provided that at least two out of all the $R^1$'s in the molecule are monovalent hydrocarbon groups substituted with a substituted or unsubstituted amino group, the amino group being bonded to the silicon atom via at least one carbon atom; $R^2$ represents a hydrogen atom or a monovalent substituted or unsubstituted hydrocarbon group; $a$ and $b$ each represent a number satisfying the relationships $1 \leq a \leq 2.5$, $1 \leq a+b \leq 2.5$, and $0 \leq b \leq 0.5$; and $n$ represents a number of from 4 to 5,000.

2. An organopolysiloxane composition as claimed in claim 1, wherein the epoxy-containing group of component (A) (2) is a glycidoxy group, an epoxycyclohexyl group or a combination thereof.

3. An organopolysiloxane composition for surface treatment which comprises:
(A) a reaction product of
(1) a silane and/or a siloxane each having a substituted or unsubstituted amino group bonded to a silicon atom via at least one carbon atom and also having an alkoxy group bonded to the silicon atom, and
(2) a silane and/or a siloxane each having a monovalent hydrocarbon group bonded to a silicon atom, the hydrocarbon group being substituted with an epoxy-containing group, and an alkoxy group bonded to the silicon atom,
(B) an organopolysiloxane represented by the following compositional formula (I):

$$[R^1_a Si(OR^2)_b O_{(4-a-b)/2}]_n \qquad (I)$$

wherein $R^1$ represents at least two substituents selected from a hydrogen atom and a monovalent substituted or unsubstituted hydrocarbon group, provided that at least two out of all the $R^1$'s in the molecule are monovalent hydrocarbon groups substituted with a substituted or unsubstituted amino group, the amino group being bonded to the silicon atom via at least one carbon atom; $R^2$ represents a hydrogen atom or a monovalent substituted or unsubstituted hydrocarbon group; a and b each represent a number satisfying the relationships $1 \leq a \leq 2.5$, $1 \leq a+b \leq 2.5$, and $0 \leq b \leq 0.5$; and n represents a number of from 4 to 5,000, (C) a diorganopolysiloxane blocked with a hydroxyl group at both terminals thereof and having a viscosity of 50 to 10,000,000 cSt at 25° C.,
(D) an organohydrogen polysiloxane having an Si—H bond and having at least three hydrogen atoms bonded to a silicon atom per molecule, and
(E) a curing catalyst which catalyzes the dehydrating condensation between the hydroxyl group of component (C) and an Si—H bond of component (D).

4. An organopolysiloxane composition as claimed in claim 3, wherein the epoxy-containing group of component (A) (2) is a glycidoxy group, an epoxycyclohexyl group or a combination thereof.

5. A surface-treated ethylene-propylene-diene terpolymer article having a non-sticky film comprising an organopolysiloxane composition which comprises:
(A) a reaction product of
(1) a silane and/or a siloxane each having a substituted or unsubstituted amino group bonded to a silicon atom via at least one carbon atom and also having an alkoxy group bonded to the silicon atom, and
(2) a silane and/or a siloxane each having a monovalent hydrocarbon group bonded to a silicon atom, the hydrocarbon group being substituted with an epoxy-containing group, and an alkoxy group bonded to the silicon atom, and
(B) an organopolysiloxane represented by the following compositional formula (I):

$$[R^1_a Si(OR^2)_b O_{(4-a-b)/2}]_n \qquad (I)$$

wherein $R^1$ represents at least two substituents selected from a hydrogen atom and a monovalent substituted or unsubstituted hydrocarbon group, provided that at least two out of all the $R^1$'s in the molecule are monovalent hydrocarbon groups substituted with a substituted or unsubstituted amino group, the amino group being bonded to the silicon atom via at least one carbon atom; $R^2$ represents a hydrogen atom or a monovalent substituted or unsubstituted hydrocarbon group; a and b each represent a number satisfying the relationships $1 \leq a \leq 2.5$, $1 \leq a+b \leq 2.5$, and $0 \leq b \leq 0.5$; and n represents a number of from 4 to 5,000.

6. A surface-treated ethylene-propylene-diene terpolymer article as claimed in claim 5, wherein said non-sticky film is a primer coat.

7. A surface-treated ethylene-propylene-diene terpolymer article having a non-sticky film comprising an organopolysiloxane composition which comprises:
(A) a reaction product of
(1) a silane and/or a siloxane each having a substituted or unsubstituted amino group bonded to a silicon atom via at least one carbon atom and also having an alkoxy group bonded to the silicon atom, and
(2) a silane and/or a siloxane each having a monovalent hydrocarbon group bonded to a silicon atom, the hydrocarbon group being substituted with an epoxy-containing group, and an alkoxy group bonded to the silicon atom,
(B) an organopolysiloxane represented by the following compositional formula (I):

$$[R^1_a Si(OR^2)_b O_{(4-a-b)/2}]_n \qquad (I)$$

wherein $R^1$ represents at least two substituents selected from a hydrogen atom and a monovalent substituted or unsubstituted hydrocarbon group, provided that at least two out of all the $R^1$'s in the molecule are monovalent hydrocarbon groups substituted with a substituted or unsubstituted amino group, the amino group being bonded to the silicon atom via at least one carbon atom; $R^2$ represents a hydrogen atom or a monovalent substituted or unsubstituted hydrocarbon group; a and b each represent a number satisfying the relationships $1 \leq a \leq 2.5$, $1 \leq a+b \leq 2.5$, and $0 \leq b \leq 0.5$; and n represents a number of from 4 to 5,000, (C) a diorganopolysiloxane blocked with a hydroxyl group at both terminals thereof and having a viscosity of 50 to 10,000,000 cSt at 25° C.,
(D) an organohydrogen polysiloxane having an Si—H bond and having at least three hydrogen atoms bonded a silicon atom per molecule, and
(E) a curing catalyst which catalyzes the dehydrating condensation between the hydroxyl group of component (C) and an Si—H bond of component (D).

8. A surface-treated ethylene-propylene-diene terpolymer article as claimed in claim 7, wherein said non-sticky film is a primer coat.

* * * * *